United States Patent
Lozhkin

(10) Patent No.: US 10,291,444 B2
(45) Date of Patent: May 14, 2019

(54) TRANSMISSION DEVICE WITH PULSE WIDTH MODULATION AND TRANSMISSION SYSTEM

(71) Applicant: FUJITSU LIMITED, Kawasaki-shi, Kanagawa (JP)

(72) Inventor: Alexander Nikolaevich Lozhkin, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/626,464

(22) Filed: Jun. 19, 2017

(65) Prior Publication Data

US 2018/0091334 A1 Mar. 29, 2018

(30) Foreign Application Priority Data

Sep. 29, 2016 (JP) .................................. 2016-191236

(51) Int. Cl.
| | |
|---|---|
| H03K 7/08 | (2006.01) |
| H03K 9/08 | (2006.01) |
| H04L 25/49 | (2006.01) |
| H04B 10/524 | (2013.01) |
| H04B 10/2575 | (2013.01) |

(52) U.S. Cl.
CPC ... *H04L 25/4902* (2013.01); *H04B 10/25753* (2013.01); *H04B 10/524* (2013.01)

(58) Field of Classification Search
USPC .............................................. 375/238, 295
See application file for complete search history.

(56) References Cited

U.S. PATENT DOCUMENTS

| | | | |
|---|---|---|---|
| 2002/0176457 A1* | 11/2002 | DeCusatis | ............ H04B 10/506 372/26 |
| 2004/0114486 A1 | 6/2004 | Tanase | |
| 2006/0017797 A1 | 1/2006 | Morimoto et al. | |

(Continued)

FOREIGN PATENT DOCUMENTS

| | | |
|---|---|---|
| JP | 2003-218456 | 7/2003 |
| JP | 2006-049854 | 2/2006 |
| JP | 2012-521701 | 9/2012 |

OTHER PUBLICATIONS

Nielsen et al., An RF Pulse Width Modulator for Switch-Model Model power Amplification of Varying Envelope Signals, Feb. 2007, IEEE, pp. 277-280. (Year: 2007).*

(Continued)

*Primary Examiner* — Wendel Cadeau
(74) *Attorney, Agent, or Firm* — Fujitsu Patent Center

(57) ABSTRACT

A transmission device outputs a modulated signal based on amplitude information and phase information respectively indicating an amplitude and a phase of a transmission symbol. The transmission device includes: an oscillation signal generation circuit configured to generate an oscillation signal based on the phase information; a laser light source configured to be driven by the oscillation signal; a bias controller configured to control a bias current of the laser light source based on the amplitude information; a photo detector configured to convert an output light of the laser light source into an electric signal; and a bandpass filter configured to filter an output signal of the photo detector so as to output the modulated signal.

7 Claims, 11 Drawing Sheets

(56) References Cited

U.S. PATENT DOCUMENTS

2012/0014694 A1    1/2012  Templ et al.
2012/0044279 A1*   2/2012  Uchino .................. G02B 27/48
                                                      345/690

OTHER PUBLICATIONS

F. H. Raab, "Radio Frequency Pulsewidth Modulation", IEEE Transactions on Communications, vol. 21, No. 8, pp. 958-966 (9 pages), Aug. 1973.
Michael Nielsen et al., "An RF Pulse Width Modulator for Switch-Mode Power Amplification of Varying Envelope Signals", IEEE, Topical Meeting on Silicon Monolithic Integrated Circuit in RF Systems, pp. 277-280 (p. 4), 2007.
Michael Nielsen et al., "A 2-GHz GaAs HBT RF Pulsewidth Modulator", IEEE Transactions on Microwave Theory and Techniques, vol. 56, No. 2, pp. 300-304 (5 pages), Feb. 2008.

* cited by examiner

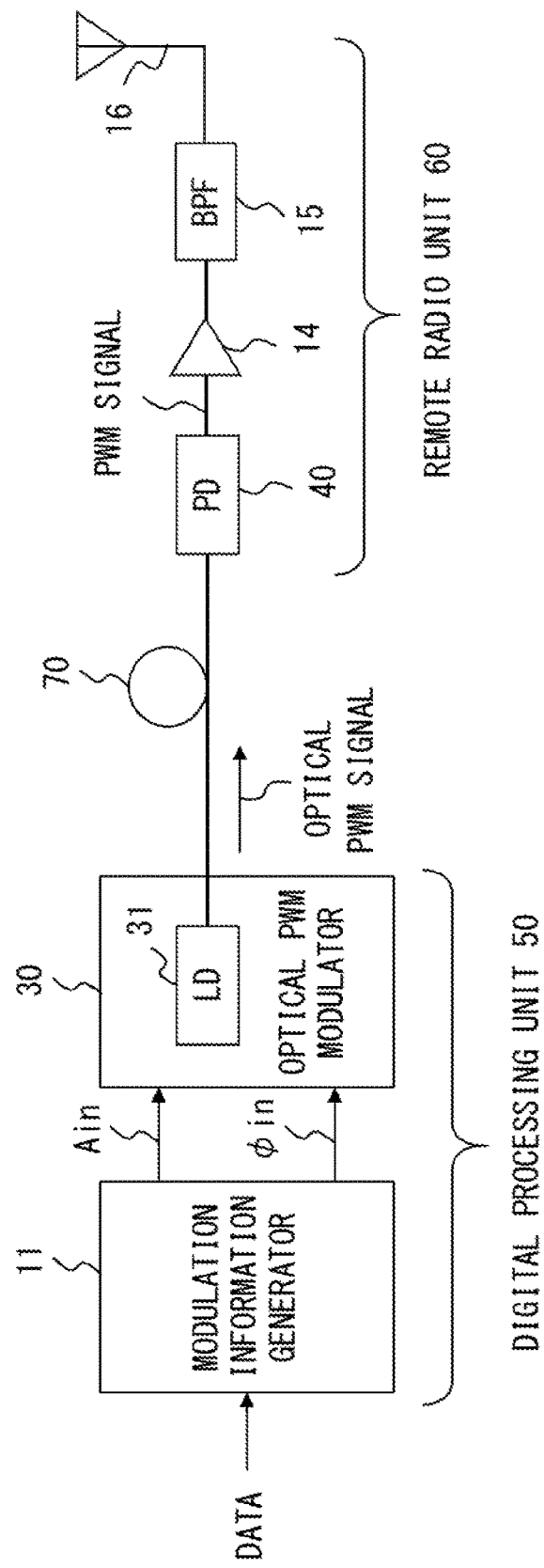
F I G. 11

TRANSMISSION DEVICE WITH PULSE WIDTH MODULATION AND TRANSMISSION SYSTEM

CROSS-REFERENCE TO RELATED APPLICATION

This application is based upon and claims the benefit of priority of the prior Japanese Patent Application No. 2016-191236, filed on Sep. 29, 2016, the entire contents of which are incorporated herein by reference.

FIELD

The present invention is related to a transmission device and a transmission system that generate a modulated signal by using a pulse width modulation and transmit the modulated signal.

BACKGROUND

A transmission device that generates a modulated signal from transmission data and outputs the modulated signal via a radio antenna is widely used in various implementations. In order to improve an efficiency of an amplifier in the transmission device, a configuration that generates a modulated signal by using pulse width modulation (PWM) is proposed.

The transmission device includes, for example, a square wave modulator 1, an amplifier 2 and a bandpass filter (BPF) 3, as illustrated in FIG. 1. The square wave modulator 1 generates a PWM (pulse width modulation) signal corresponding to an amplitude and a phase of an input modulated signal. A width of a pulse corresponds to an amplitude $A_{in}$ of the input modulated signal. A timing of a pulse (that is, a position of a pulse in the time domain) corresponds to a phase $\varphi_{in}$ of the input modulated signal. A repetition frequency of a pulse train corresponds to a carrier frequency of an output signal of the transmission device. The amplifier 2 amplifies the PWM signal. Since the PWM signal is a two-level signal (in monopolar PWM), the amplifier 2 can amplify the PWM signal by switching operation. Thus, the amplifier 2 may be implemented by, for example, an efficient class-D high-power amplifier. The BPF 3 extracts a carrier frequency component. According to the configuration, the transmission device can amplify the input modulated signal and transmit the amplified signal. It is preferable that a phase $\varphi_{out}$ of the output signal of the transmission device match the phase $\varphi_{in}$ of the input modulated signal.

As described above, according to a configuration in which an input data signal is converted into a PWM signal on the input side of an amplifier and a bandpass filter is implemented on the output side of the amplifier, an efficiency of the amplifier improves. Note that technologies of processing a signal using PWM are described, for example, in the Documents 1-3 listed below.

Document 1: F. H. Raab, Radio Frequency Pulsewidth Modulation, IEEE Trans on Communications, vol. 21, No. 8, pp. 958-966, August 1973

Document 2: Michael Nielsen et al., An RF Pulse Width Modulator for Switch-Mode Power Amplification of Varying Envelope Signals, Topical Meeting on Silicon Monolithic Integrated Circuit in RF Systems, pp. 277-280, 2007 IEEE Document 3: Michael Nielsen et al., A 2-GHz GaAs HBT RF Pulsewidth Modulator, IEEE Trans on Microwave technology and techniques, vol. 56, No. 2, pp. 300-304, February 2008

The square wave modulator 1 for generating a PWM signal in FIG. 1 includes a comparator that compares an amplitude information signal to indicate an amplitude of a transmission symbol and a sine wave signal of a carrier frequency. When the sine wave signal is higher than the amplitude information signal, a pulse is output from the comparator. Thus, a pulse width of the PWM signal depends on an amplitude of the transmission symbol.

However, in a case where the transmission device transmits an RF (radio frequency) signal, an operation speed of a conventional comparator is not sufficient. That is, it is difficult for the conventional comparator to generate a pulse of a sufficiently narrow width. Accordingly, when the transmission device transmits an RF signal, the PWM signal generated by the comparator may be distorted.

SUMMARY

According to an aspect of the present invention, a transmission device outputs a modulated signal based on amplitude information and phase information respectively indicating an amplitude and a phase of a transmission symbol. The transmission device includes: an oscillation signal generation circuit configured to generate an oscillation signal based on the phase information; a laser light source configured to be driven by the oscillation signal; a bias controller configured to control a bias current of the laser light source based on the amplitude information; a photo detector configured to convert an output light of the laser light source into an electric signal; and a bandpass filter configured to filter an output signal of the photo detector so as to output the modulated signal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 illustrates an example of a distributed antenna system.

DESCRIPTION OF EMBODIMENTS

Figure 1:
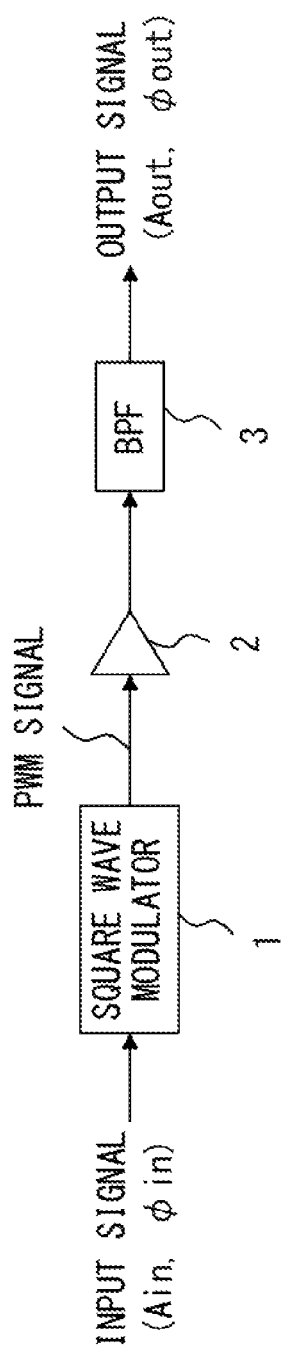
FIG. 1 illustrates an example of a transmission device that generates a modulated signal using a pulse width modulation and transmits the modulated signal.
Figure 2:
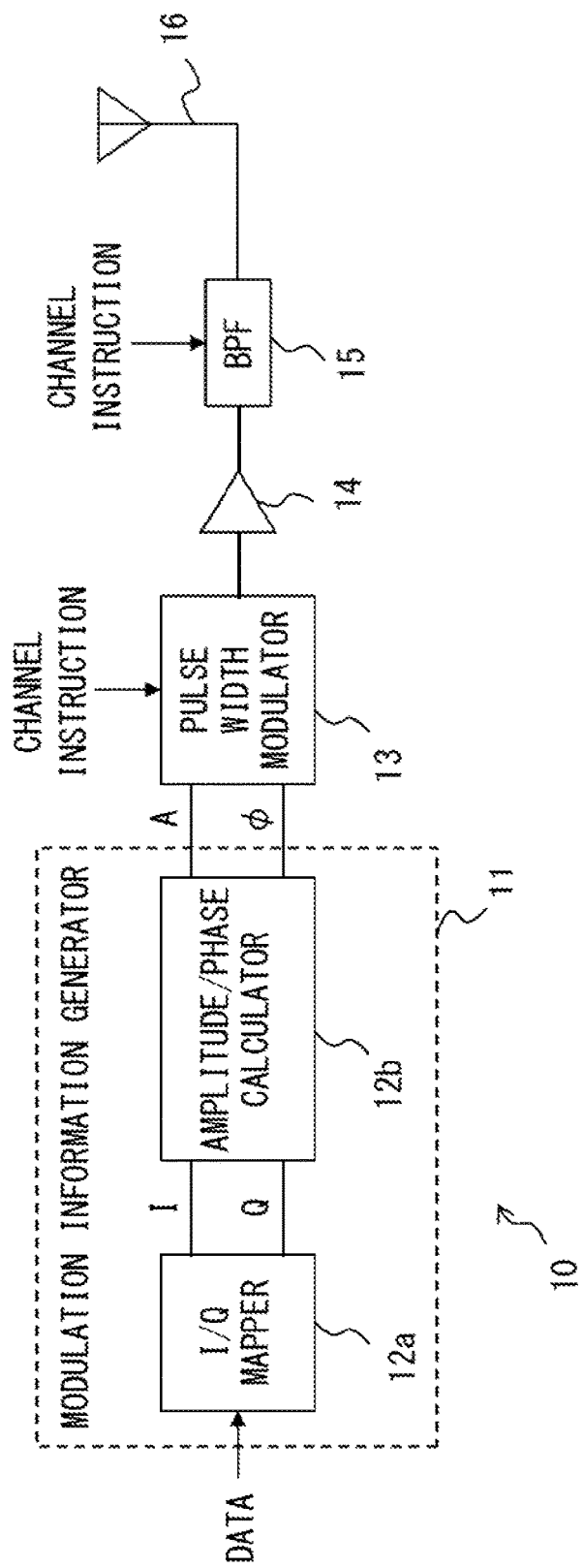
FIG. 2 illustrates an example of a transmission device according to an embodiment of the present invention.

FIG. 2 illustrates an example of a transmission device according to an embodiment of the present invention. The transmission device 10 according to the embodiment includes a modulation information generator 11, a pulse width modulator 13, an amplifier 14, a bandpass filter (BPF) 15, and an antenna 16, as illustrated in FIG. 2. The transmission device 10 may further include a circuit element that is not illustrated in FIG. 2.

A digital data signal is input to the transmission device 10. The digital data signal may be an OFDM (orthogonal frequency division multiplexing) signal.

The modulation information generator 11 generates modulation information based on the data signal. The modulation information includes amplitude information A and phase information φ respectively indicating an amplitude and a phase of a transmission symbol. The modulation information generator 11 includes an I/Q mapper 12a and an amplitude/phase calculator 12b in this example. The I/Q mapper 12a generates a symbol sequence from an input data signal according to a specified modulation format (such as QPSK, 16QAM, 64QAM, 256QAM and so on). Each symbol is indicated by an I (in-phase) component and a Q (quadrature) component. The amplitude/phase calculator 12b calculates an amplitude and a phase of each symbol based on an I component signal and a Q component signal output from the I/Q mapper 12a. The modulation information generator 11 is implemented by, for example, a processor system that includes a processor element and a memory. Alternatively, the modulation information generator 11 may be implemented by a digital signal processing circuit.

Note that the modulation information generator 11 does not need to include the I/Q mapper 12a. That is, the modulation information generator 11 may generate the amplitude information and the phase information respectively indicating an amplitude and a phase of a transmission symbol based on the input data signal without using an I/Q mapper.

The pulse width modulator 13 generates a pulse width modulated signal (PWM signal) based on the amplitude information $A_{in}$ and the phase information $\varphi_{in}$ generated by the modulation information generator 11. A pulse width of the PWM signal depends on the amplitude information. A position of a pulse of the PWM signal in the time domain (that is, timing) depends on the phase information. Here, the pulse width modulator 13 may generate the PWM signal according to a channel instruction. The channel instruction indicates a frequency channel used by the transmission device 10 in a communication system in which a plurality of frequency channels of different carrier frequencies are multiplexed. That is, the channel instruction specifies a carrier frequency of a modulated RF signal transmitted by the transmission device 10. The channel instruction is generated by, for example, a user or a network management system. Then the channel instruction is given to the pulse width modulator 13 and the BPF 15 from a controller (not illustrated in FIG. 2) implemented in the transmission device 10.

The amplifier 14 amplifies the PWM signal generated by the pulse width modulator 13. Here, since the PWM signal is a two-level signal (in monopolar PWM), the amplifier 14 can amplify the PWM signal by switching operation. Thus, the amplifier 14 may be implemented by, for example, an efficient class-D high-power amplifier. The BPF 15 passes a carrier frequency of an output signal of the transmission device 10 (that is, a modulated RF signal output from the transmission device 10) according to the channel instruction.

A width of the passband of the BPF 15 may be determined based on a bit rate of the data signal and a modulation format. In addition, the BPF 15 may be implemented by, for example, a frequency tunable bandpass filter.

The output signal of the BPF 15 may be transmitted to a mobile station via the antenna 16. At this point, the output signal of the BPF 15 may be up-converted to a desired frequency band as necessary.

In the transmission device 10, an input signal S(t) of the pulse width modulator 13 may be expressed by formula (1).

$$S(t)=A_{in}(t)\exp\{\varphi_{in}\} \quad (1)$$

$A_{in}$ indicates the amplitude information. $\varphi_{in}$ indicates the phase information.

The PWM signal output from the pulse width modulator 13 is amplified by the amplifier 14 with a gain G. The BPF 15 extracts a frequency component $f_c$ specified by the channel instruction from the amplified PWM signal. Note that, as described above, the BPF 15 has a passband of a specified bandwidth. In addition, in the descriptions below, the frequency $f_c$ indicates a frequency of an oscillation signal that is used for generating the PWM signal in the pulse width modulator 13. In this case, the output signal $S_{out}(t)$ of the BPF 15 may be expressed by formula (2).

$$S_{out}(t)=A_{out}(t)\exp\{\omega_c t+\varphi_{out}\}$$

$$\omega_c=2\pi f_c \quad (2)$$

The BPF 15 removes high-order frequency components (that is, harmonics) generated in the pulse width modulator 13 and the amplifier 14. Here, it is assumed that the gain G of the amplifier 14 is "1" to simplify the description. By doing this, the amplifier 14 can be omitted in the description of the operations of the transmission device 10.

Figure 3:
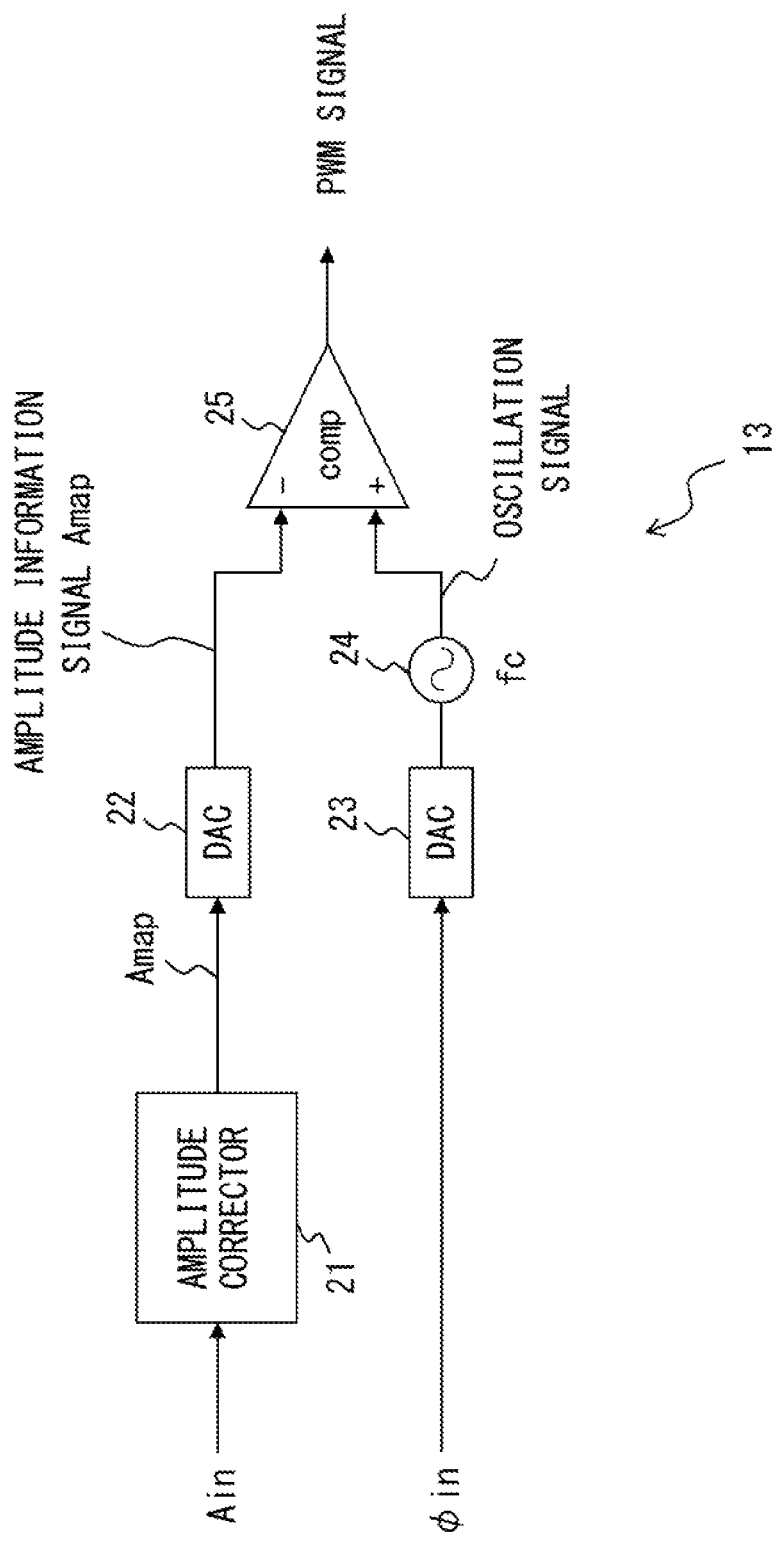
FIG. 3 illustrates an example of a pulse width modulator.

FIG. 3 illustrates an example of the pulse width modulator 13. The pulse width modulator 13 includes an amplitude corrector 21, D/A converters (DAC: Digital-to-Analog converter) 22 and 23, an oscillator 24 and a comparator 25 in this example, as illustrated in FIG. 3.

The amplitude corrector 21 corrects the amplitude information $A_{in}$ so as to generate the amplitude information $A_{map}$. Specifically, the amplitude corrector 21 generates the amplitude information $A_{map}$ from the amplitude information $A_{in}$ such that an amplitude $A_{out}$ of an output signal of the BPF 15 illustrated in FIG. 2 is linear with respect to the amplitude information $A_{in}$. For example, the amplitude corrector 21 may generate $A_{map}$ from $A_{in}$ in formula (3) below.

$$A_{map} = \sin\left[\frac{\pi}{2} - \arcsin\{A_{in}\}\right] \quad (3)$$

The D/A converter 22 converts the amplitude information $A_{map}$ into an analog signal. In the description below, this analog signal may be referred to as an amplitude information signal. That is, the D/A converter 22 generates the amplitude information signal $A_{map}$ from the amplitude information $A_{map}$ by digital-to-analog conversion. The D/A converter 23 converts the phase information $\varphi_{in}$ into an analog signal. In the description below, this analog signal may be referred to as a phase information signal. That is, the D/A converter 23 generates the phase information signal $\Phi_{in}$ from the phase information $\varphi_{in}$ by digital-to-analog conversion.

The oscillator 24 generates an oscillation signal of a specified frequency $f_c$. The oscillator 24 may generate an oscillation signal of a frequency corresponding to the channel instruction. A waveform of the oscillation signal is, for example, a sine wave. A phase of the oscillation signal is controlled by the phase information signal $\varphi_{in}$. The oscillator 24 may be implemented by, for example, a voltage-controlled oscillator (VCO).

The comparator 25 generates a PWM signal based on a comparison between the amplitude information signal $A_{map}$ and the oscillation signal. In this example, a pulse is generated when the oscillation signal is higher than the amplitude information signal $A_{map}$.

Now a spectrum of a PWM signal output from the pulse width modulator 13 illustrated in FIG. 3 can be expressed by a Fourier series in formula (4).

$$w(t, y, \varphi) = \frac{y}{\pi} + \frac{2}{\pi} \sum_{m=1}^{\infty} \left[ \frac{(-1)^m}{2m} \sin\{2my\} \cos\{2m(\omega_c t + \varphi)\} + \frac{(-1)^{m+1}}{2m-1} \sin\{(2m-1)y\} \sin\{(2m-1)(\omega_c t + \varphi)\} \right] \quad (4)$$

y indicates a pulse width. $\omega_c$ indicates an angular frequency of the oscillation signal generated by the oscillator 24.

The PWM signal output from the pulse width modulator 13 is filtered by the BPF 15. It is assumed that a center frequency of the passband of the BPF 15 is $f_c$ ($\omega_c = 2\pi f_c$). In this case, the output signal $S_{out}$ of the BPF 15 is expressed by formula (5).

$$S_{out} = \frac{2}{\pi} \sin\{y\} \sin\{\omega_c t + \varphi\} = A_{out} \cdot \sin\{\omega_c t + \varphi\} \quad (5)$$
$$A_{out} = \frac{2}{\pi} \sin\{y\}$$

When $A_{in}$ is converted into $A_{map}$ by the amplitude corrector 21, the pulse width y is expressed by formula (6).

$$y = \arcsin\{k_1 \cdot A_{in}\} \quad (6)$$

Thus, as expressed by formula (7), the amplitude $A_{out}$ of the output signal of the BPF 15 is linear with respect to the amplitude information $A_{in}$.

$$A_{out} = \frac{\pi}{2} \sin\{y\} = \frac{\pi}{2} \sin[\arcsin\{k_1 \cdot A_{in}\}] \propto A_{in} \quad (7)$$

As described above, the amplitude corrector 21 performs a pre-distortion process on the amplitude information $A_{in}$ by using an inverse sine function. As a result, the amplitude $A_{out}$ of the output signal of the BPF 15 is linear with respect to the amplitude information $A_{in}$. In addition, since the phase $\varphi$ does not change in the pulse width modulator 13, the phase $\varphi_{out}$ of the output signal of the BPF 15 is the same as the phase information $\varphi_{in}$. That is, formula (8) below is satisfied. Accordingly, the transmission device 10 can transmit a non-distorted signal.

$$A_{out} = k \cdot A_{in}$$

$$\varphi_{out} = \varphi_{in} \quad (8)$$

First Embodiment

As described above, in the example illustrated in FIG. 3, the pulse width modulator 13 generates a PWM signal from the amplitude information signal and the oscillation signal using the comparator 25. However, in a case where the transmission device 10 transmits a modulated RF signal, an operation speed of a conventional comparator is not sufficient. Thus, the PWM signal generated by the comparator 25 may be distorted.

In order to solve the problem, according to the first embodiment, the pulse width modulator 13 includes an optical PWM modulator that generates an optical PWM signal and a photo detector that converts the optical PWM signal into an electric signal.

Figure 4:
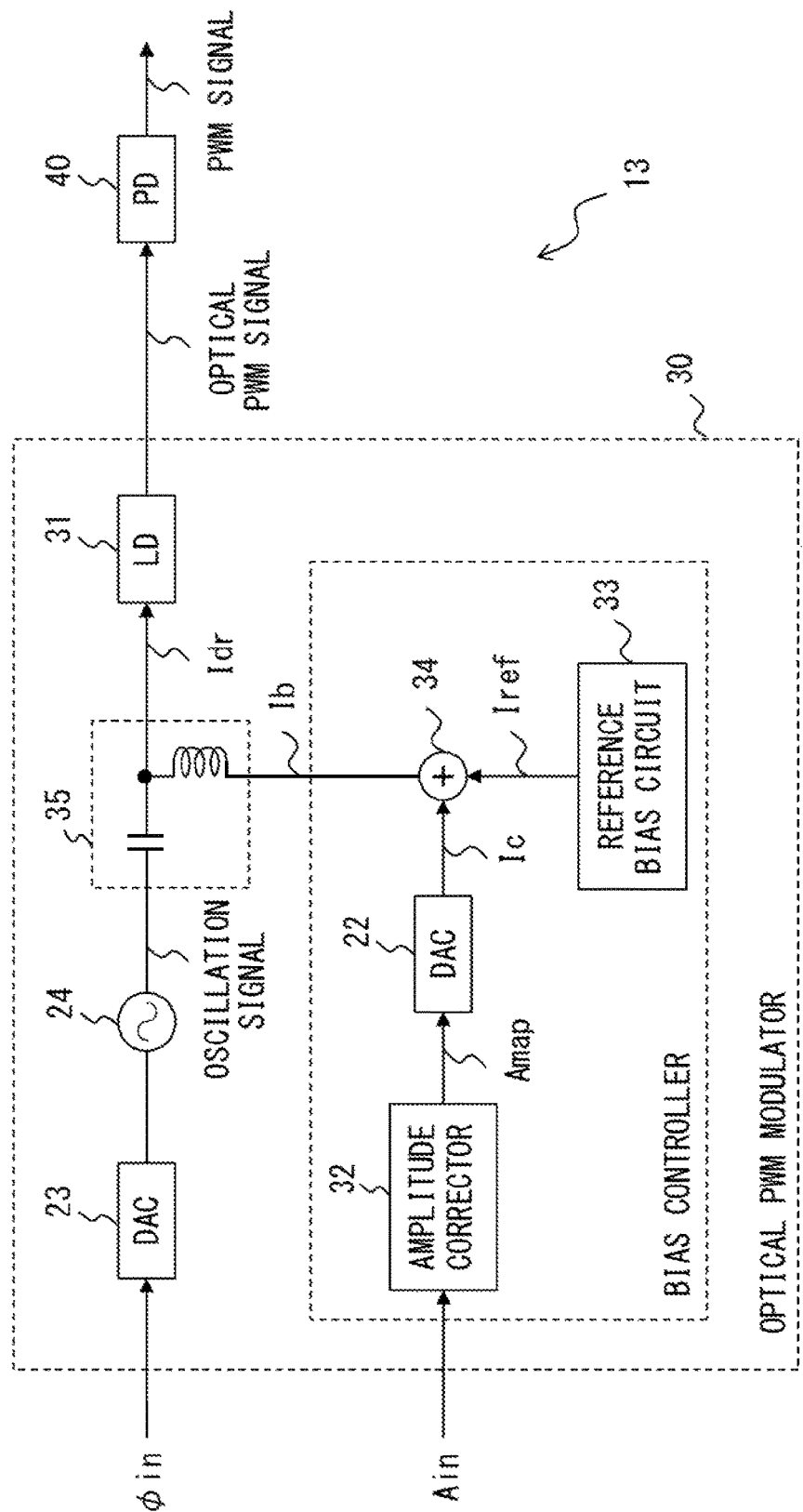
FIG. 4 illustrates an example of a pulse width modulator that is implemented in a transmission device according to a first embodiment.

FIG. 4 illustrates an example of the pulse width modulator 13 that is implemented in a transmission device according to the first embodiment. Note that the modulation information generator 11 illustrated in FIG. 2 is provided on the input side of the pulse width modulator 13. The amplifier 14, the BPF 15 and the antenna 16 are provided on the output side of the pulse width modulator 13.

The pulse width modulator 13 includes an optical PWM modulator 30 and a photo detector 40. The optical PWM modulator 30 generates an optical PWM signal based on the amplitude information $A_{in}$ and the phase information $\varphi_{in}$ of a transmission symbol. The photo detector 40 converts the optical PWM signal generated by the optical PWM modulator 30 into an electric signal. That is, the pulse width modulator 13 can generate a PWM signal based on the amplitude information $A_{in}$ and the phase information $\varphi_{in}$. Note that the photo detector 40 is implemented by, for example, a photo diode.

The optical PWM modulator 30 includes the D/A converters (DAC) 22 and 23, the oscillator 24, a laser light source 31, an amplitude corrector 32, a reference bias circuit 33, an adder 34, and a bias-T circuit 35. Note that the D/A converters 22 and 23 and the oscillator 24 are substantially the same in FIG. 3 and FIG. 4.

Figure 5:
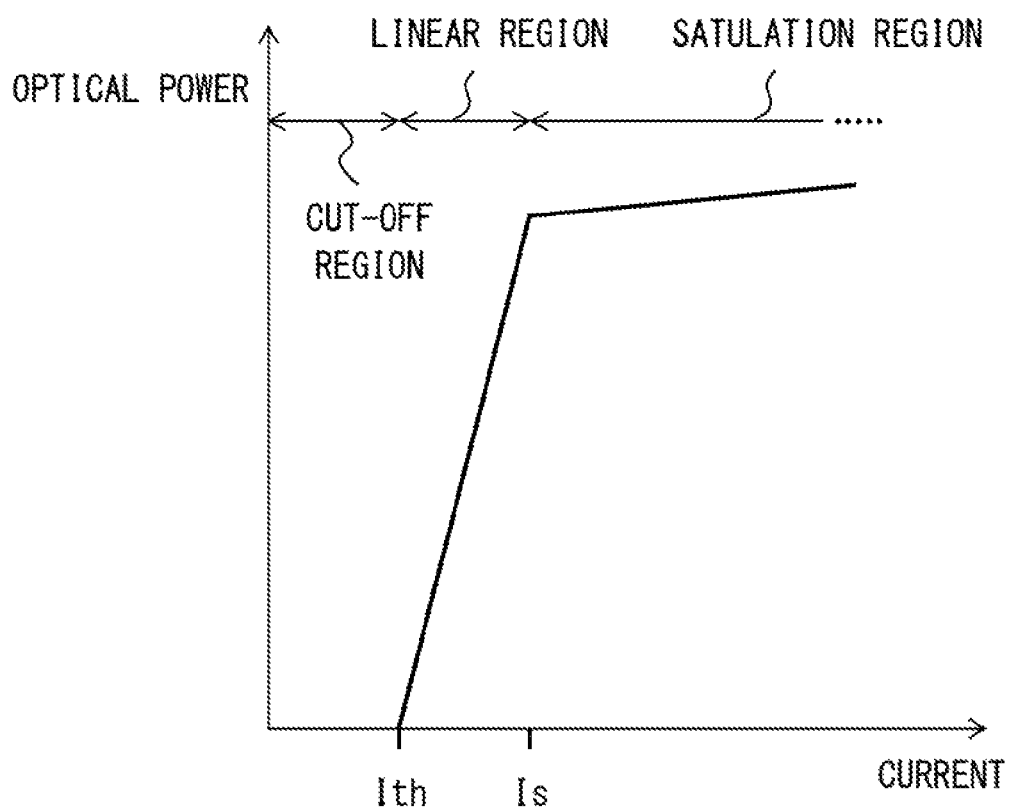
FIG. 5 illustrates an example of a characteristic of a laser light source.

The laser light source 31 emits light according to a drive current. In this example, an output optical power of the laser light source 31 varies according to the drive current as illustrated in FIG. 5. When the drive current is smaller than $I_{th}$ (cut-off region), the output optical power is zero or very small. In the description below, it is assumed that the output optical power in the cut-off region is zero. When the drive current is within a range from $I_{th}$ to $I_s$ (linear region), the output optical power linearly varies with respect to the drive current. When the drive current is larger than $I_s$ (saturation region), the output optical power is saturated.

Note that, in this example, it is preferable that a gradient of the output optical power with respect to the drive current be sufficiently steep in the linear region. In addition, it is preferable that a gradient of the output optical power with respect to the drive current be sufficiently gentle (or flat) in the saturation region.

The amplitude corrector 32 corrects the amplitude information $A_{in}$ so as to generate the amplitude information $A_{map}$. However, the mapping operation of the amplitude corrector 32 may be different from that of the amplitude corrector 21 illustrated in FIG. 3. The mapping operation of the amplitude corrector 32 will be described later.

The amplitude corrector 32 is implemented by, for example, a processor system that includes a processor element and a memory. Note that the amplitude corrector 32 and the modulation information generator 11 may be implemented by one processor system or by two independent processor systems. Alternatively, the amplitude corrector 32 may be implemented by a digital signal processor (DSP) or a digital signal processing circuit.

The D/A converter 22 converts the amplitude information $A_{map}$ corrected by the amplitude corrector 32 into an analog signal so as to generate control current $I_c$. That is, the control current $I_c$ corresponding to the amplitude information $A_{in}$ is generated by the amplitude corrector 32 and the D/A converter 22. The reference bias circuit 33 generates reference bias current $I_{ref}$. The reference bias current $I_{ref}$ controls an operation point of the laser light source 31. The adder 34 adds the control current $I_c$ to the reference bias current $I_{ref}$ so as to generate bias current $I_b$. Note that the amplitude corrector 32, the D/A converter 22, the reference bias circuit 33, and the adder 34 operate as a bias controller that controls a bias current of the laser light source 31 based on the amplitude information $A_{in}$.

The bias-T circuit 35 adds the bias current $I_b$ to the oscillation signal output from the oscillator 24 so as to generate drive current $I_{dr}$. The drive current $I_{dr}$ is given to the laser light source 31. That is, the laser light source 31 is driven by the oscillation signal to which the bias current $I_b$ is added.

Note that a configuration in which a signal and a bias current are fed to a semiconductor laser using a bias-T is described in Japanese Laid-open Patent publication No. 2003-224522 for example. However, in this patent document, the semiconductor laser is configured so as to operate in the linear region.

In the pulse width modulator 13, the optical PWM modulator 30 generates an optical pulse train (that is, an optical PWM signal) with a pulse width corresponding to the amplitude information $A_{in}$. At this point, the optical PWM modulator 30 controls the bias current $I_b$ according to the amplitude information $A_{in}$ so as to control the drive current $I_{dr}$. Then the laser light source 31 outputs the optical PWM signal according to the drive current $I_{dr}$.

The output light of the laser light source 31 is converted into an electric signal by the photo detector 40. The laser light source 31 and the photo detector 40 is optically connected by, for example, an optical fiber. Alternatively, the output light of the laser light source 31 may be guided to the photo detector 40 by an optical system including a lens and/or a mirror.

Figure 6A:
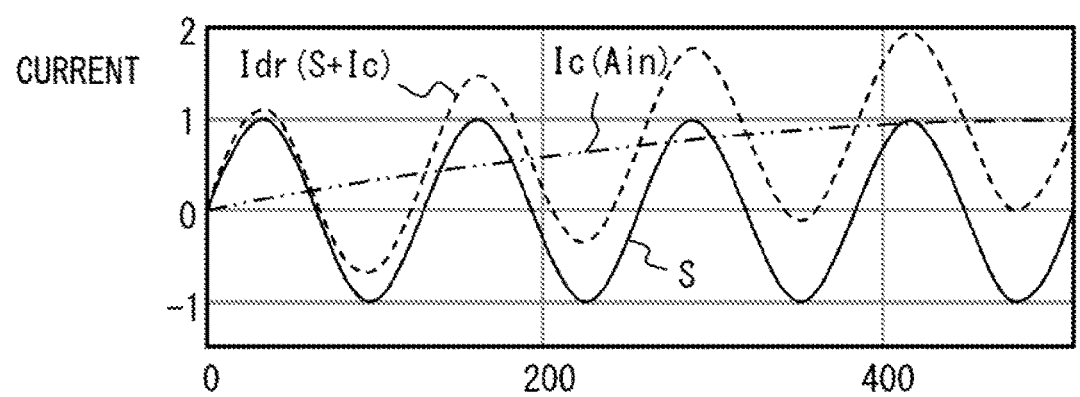
FIGS. 6A and 6B illustrate an example of current generated in an optical PWM modulator and an output optical power of the laser light source.
Figure 6B:
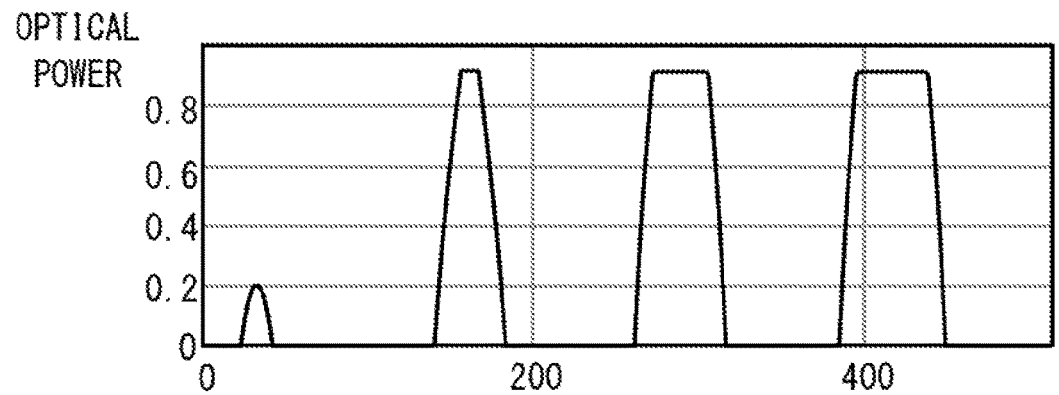

FIGS. 6A and 6B illustrate an example of current generated in the optical PWM modulator 30 and an output optical power of the laser light source 31. In FIG. 6A, S indicates a current caused by the oscillation signal that is generated by the oscillator 24. In this example, a waveform of the current S is a sine wave. $I_c$ indicates the control current that is generated based on the amplitude information $A_{in}$ by the amplitude corrector 32 and the D/A converter 22. S+$I_c$ indicates the drive current $I_{dr}$ that is to be given to the laser light source 31. Note that in this example, the reference bias current $I_{ref}$ is zero.

In the example illustrated in FIG. 6A, the amplitude information $A_{in}$ gradually increases from left to right, and accordingly the control current $I_c$ also gradually increases. As a result, the drive current $I_{dr}$ (that is, S+$I_c$) of the laser light source 31 also gradually increases.

FIG. 6B illustrates the output power of the laser light source 31. In this example, when the drive current $I_{dr}$ (that is, S+$I_c$) is larger than "1" in FIG. 6A, the laser light source 31 emits light.

When the control current $I_c$ is small, as illustrated in FIG. 6B, an optical pulse width is narrow. On the other hand, when the control current $I_c$ is large, the optical pulse width is wide. Here, the control current $I_c$ is generated based on the amplitude information $A_{in}$. Therefore, the optical PWM modulator 30 generates an optical PWM signal with a pulse width corresponding to the amplitude information $A_{in}$.

Figure 7:
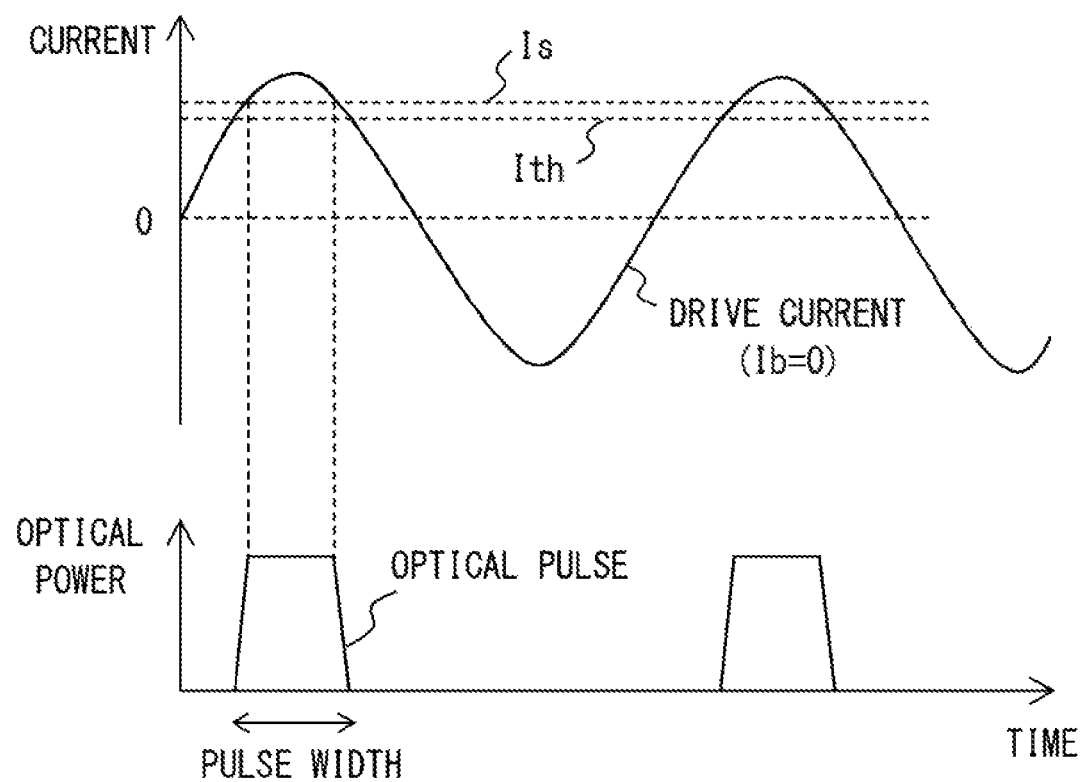
FIG. 7 illustrates an example of an optical pulse generated by the laser light source.

FIG. 7 illustrates an example of an optical pulse generated by the laser light source 31. In the example illustrated in FIG. 7, the bias current $I_b$ is zero. In this case, a drive current caused by the oscillation signal is given to the laser light source 31. In addition, it is assumed that the output optical power is flat with respect to the drive current in the saturation region to simplify the figure.

When the drive current is smaller than the threshold current $I_{th}$ illustrated in FIG. 5, the output optical power of the laser light source 31 is zero. Note that when a negative drive current is given to the laser light source 31, the output optical power is also zero.

When the drive current is larger than the threshold current $I_{the}$ the laser light source 31 emits light. Further, when the drive current is larger than the threshold current $I_s$, the output power is constant due to saturation. Thus, when the drive current caused by the oscillation signal is given to the laser light source 31, as illustrated in FIG. 7, optical pulses are generated. Specifically, one optical pulse is generated in one cycle of the oscillation signal.

A width of the optical pulse can be controlled by using the bias current $I_b$ of the laser light source 31. That is to say, the optical PWM modulator 30 can control a width of the optical pulse by using the bias current $I_b$. Note that the bias current $I_b$ is generated by adding the control current $I_c$ to the reference bias current $I_{ref}$.

Figure 8:
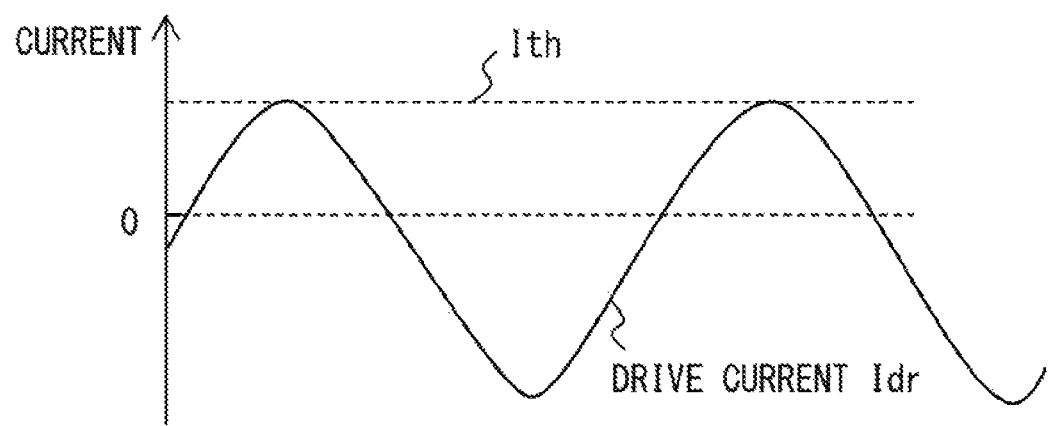
FIG. 8 illustrates an example of a method for determining reference bias current.

The reference bias current $I_{ref}$ may be determined such that a width of an optical pulse output from the laser light source 31 becomes zero when the amplitude information $A_{in}$ is zero. In this example, it is assumed that when the amplitude information $A_{in}$ is zero, the amplitude information $A_{map}$ generated by the amplitude corrector 32 is also zero. In this case, the reference bias circuit 33 may generate the reference bias current $I_{ref}$ such that a peak of the drive current $I_{dr}$ matches the threshold current $I_{th}$ when the amplitude information $A_{in}$ is zero, as illustrated in FIG. 8. Note that in the example illustrated in FIG. 8, a negative reference bias current is generated.

The optical PWM modulator 30 generates the control current $I_c$ according to the amplitude information $A_{in}$. Specifically, the amplitude corrector 32 generates the amplitude information $A_{map}$ from the amplitude information $A_{in}$. Note that a method for generating the amplitude information $A_{map}$ from the amplitude information $A_{in}$ will be described later. The D/A converter 22 converts the amplitude information $A_{map}$ into an analog signal so as to generate the control current $I_c$. In this case, the control current $I_c$ may be proportional to the amplitude information $A_{map}$.

The optical PWM modulator 30 generates the bias current $I_b$ of the laser light source 31 by adding the control current $I_c$ to the reference bias current $I_{ref}$. Here, the reference bias current $I_{ref}$ is substantially constant. Thus, the bias current $I_b$ can be controlled by the control current $I_c$. Therefore, the optical PWM modulator 30 can generate a bias current $I_b$ that varies according to the amplitude information $A_{in}$ by controlling the control current $I_c$ based on the amplitude information $A_{in}$.

Figure 9A:
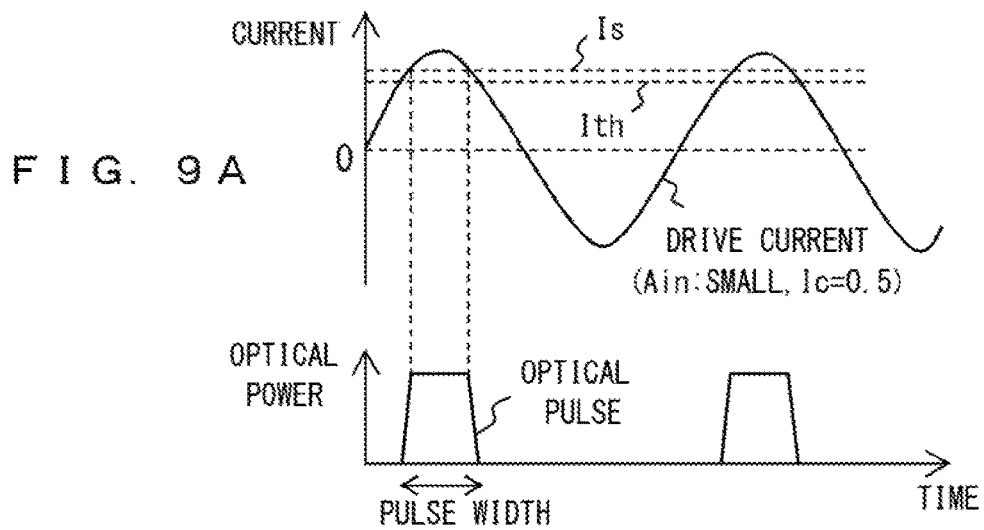
FIGS. 9A-9C illustrate examples of a relationship between the amplitude information and an optical pulse width.
Figure 9B:
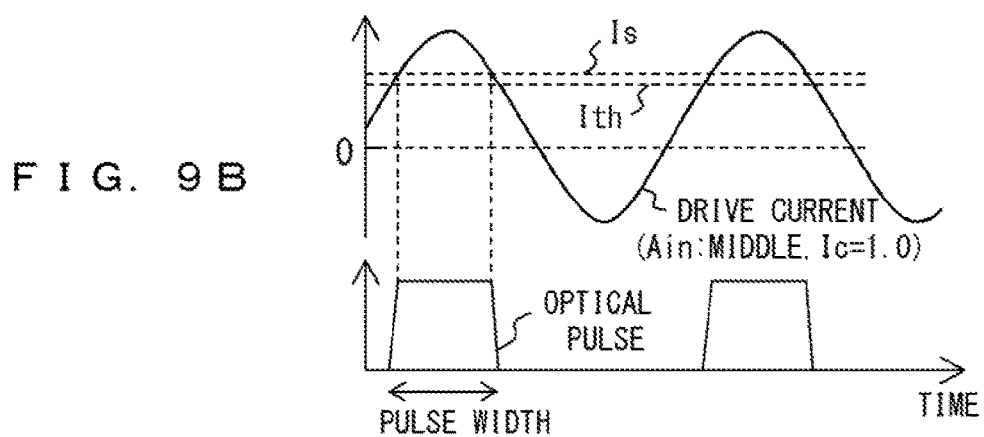
Figure 9C:
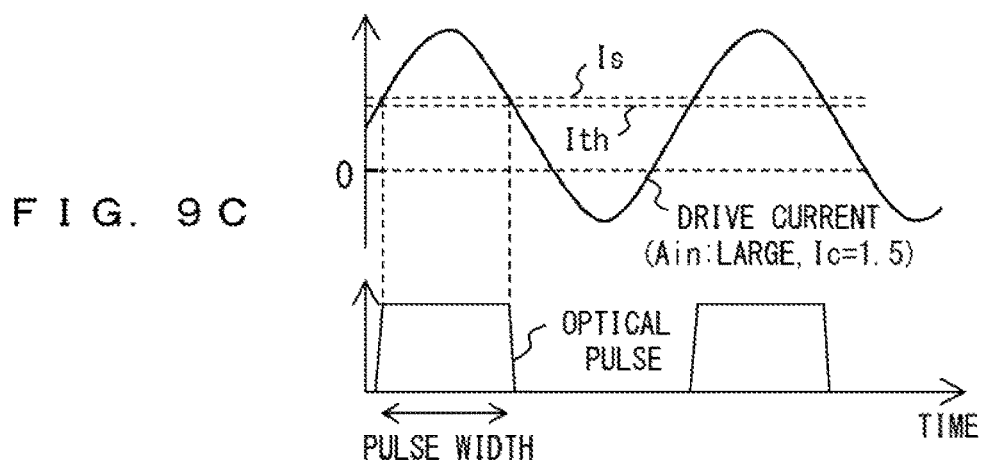

FIGS. 9A-9C illustrate examples of a relationship between the amplitude information $A_{in}$ and an optical pulse width. In this example, it is assumed that the reference bias current $I_{ref}$ is adjusted according to a method illustrated in FIG. 8.

When the amplitude information $A_{in}$ is small, the control current $I_c$ is also small. In this case, a peak of the drive current $I_{dr}$ slightly exceeds the threshold current $I_{th}$ of the laser light source 31, as illustrated in FIG. 9A. Here, an optical pulse is output from the laser light source 31 when the drive current $I_{dr}$ is larger than the threshold current $I_{th}$. Thus, a width of the optical pulse output from the laser light source 31 is narrow.

When the amplitude information $A_{in}$ becomes larger compared with a state illustrated in FIG. 9A, the control current $I_c$ increases. In this case, as illustrated in FIG. 9B, the drive current $I_{dr}$ increases and a period of time in which the drive current $I_{dr}$ is larger than the threshold current $I_{th}$ becomes longer. As a result, a width of the optical pulse output from the laser light source 31 is wider.

When the amplitude information $A_{in}$ becomes still larger compared with a state illustrated in FIG. 9B, the control current $I_c$ further increases. In this case, as illustrated in FIG. 9C, the drive current $I_{dr}$ further increases and a period of time in which the drive current $I_{dr}$ is larger than the threshold current $I_{th}$ becomes still longer. As a result, a width of the optical pulse output from the laser light source 31 is further wider.

As described above, the optical PWM modulator 30 can control an optical pulse width based on the amplitude information $A_{in}$. Specifically, when the amplitude information $A_{in}$ is small, a narrow optical pulse is generated, and when the amplitude information $A_{in}$ is large, a wide optical pulse is generated.

The optical PWM modulator 30 generates the amplitude information $A_{map}$ from the amplitude information $A_{in}$ by using the amplitude corrector 32 such that a narrow optical pulse is generated when the amplitude information $A_{in}$ is small and a wide optical pulse is generated when the amplitude information $A_{in}$ is large. Specifically, the amplitude corrector 32 generates the amplitude information $A_{map}$ from the amplitude information $A_{in}$ such that the amplitude $A_{out}$ of the output signal of the BPF 15 illustrated in FIG. 2 is linear with respect to the amplitude information $A_{in}$.

The amplitude corrector 32 may include a lookup table that stores mapping data for generating the amplitude information $A_{map}$ from the amplitude information $A_{in}$. In this case, the amplitude corrector 32 accesses the lookup table with the amplitude information $A_{in}$ to obtain corresponding amplitude information $A_{map}$. The lookup table is implemented, for example, in the amplitude corrector 32. Alternatively, the lookup table may be implemented in a memory which the amplitude corrector 32 can access.

Figure 10:
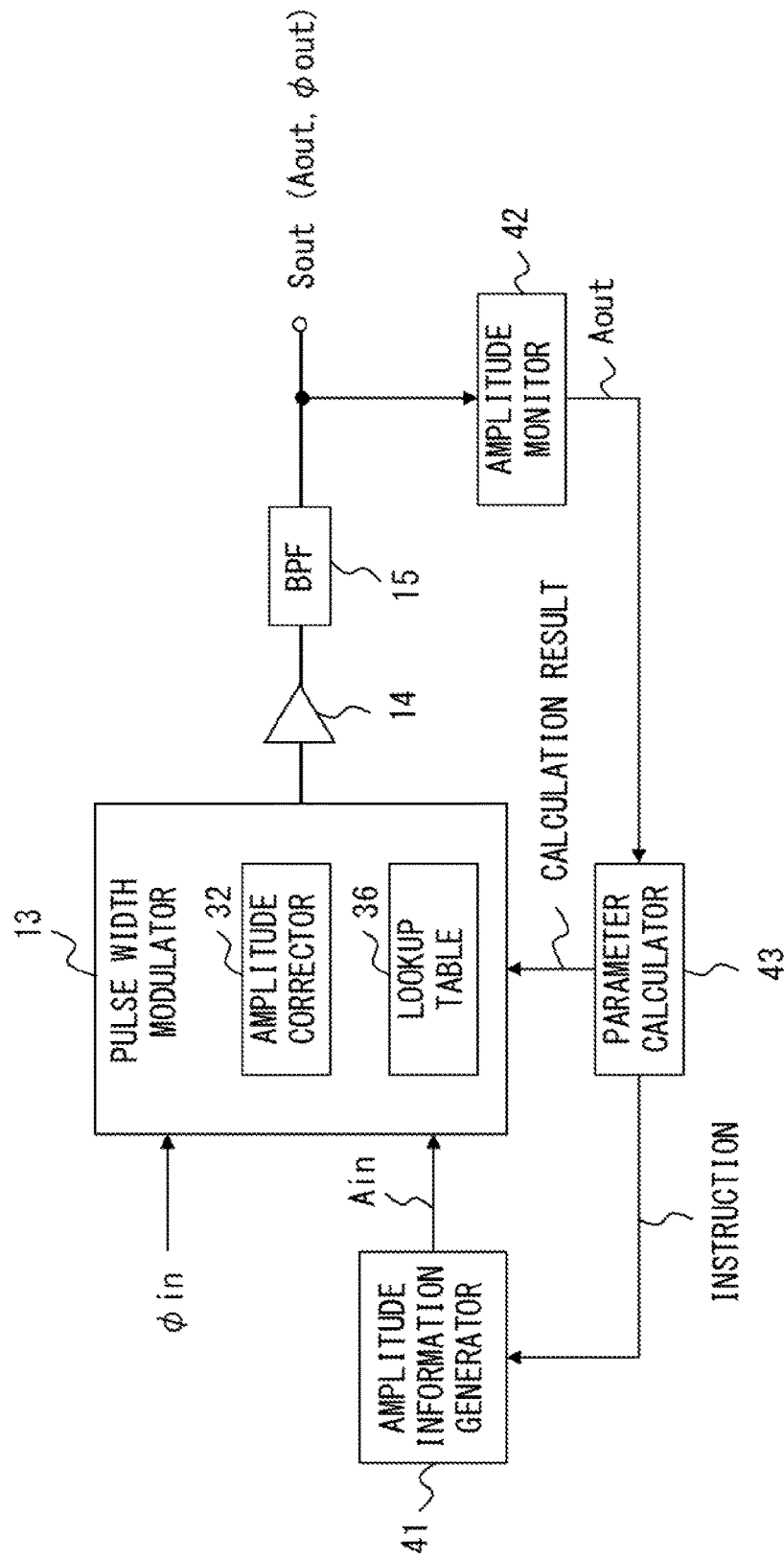
FIG. 10 illustrates an example of a method for preparing a lookup table.

FIG. 10 illustrates an example of a method for preparing a lookup table. In this example, the pulse width modulator 13 is configured as illustrated in FIG. 4.

An amplitude information generator 41 generates amplitude information $A_{in}$ based on an instruction given from the parameter calculator 43. The amplitude information $A_{in}$ is fed from the amplitude information generator 41 to the pulse width modulator 13. It is assumed that the phase information $\varphi_{in}$ is constant. An amplitude monitor 42 monitors an amplitude $A_{out}$ of a modulated RF signal output from the BPF 15. The parameter calculator 43 changes the amplitude information $A_{in}$ step-by-step from zero to a specified maximum amplitude and obtains monitor results of the amplitude monitor 42 for respective steps. During this process, the parameter calculator 43 calculates parameters for generating $A_{map}$ from $A_{in}$ such that the amplitude $A_{out}$ is linear with respect to the amplitude information $A_{in}$. Then the calculation result is stored in the lookup table 36.

As described above, the transmission device 10 according to the first embodiment includes the pulse width modulator 13 illustrated in FIG. 4. The pulse width modulator generates an optical PWM signal with a pulse width corresponding to amplitude information $A_{in}$. The optical PWM signal is converted into an electric PWM signal and then filtered by the BPF 15. At this point, the amplitude information $A_{in}$ is mapped to amplitude information $A_{map}$ by the amplitude corrector 32 such that an amplitude $A_{out}$ of an output signal of the BPF 15 is linear with respect to the amplitude information $A_{in}$. Thus, the transmission device 10 can transmit a non-distorted or distortion-suppressed modulated RF signal.

In addition, the transmission device 10 according to the first embodiment generates a PWM signal using the laser light source 31 and the photo detector 40 in place of the comparator 25 illustrated in FIG. 3. Here, an operation speed of the comparator 25 may not be sufficient for an RF signal. On the other hand, the operation speed of each of the laser light source 31 and the photo detector 40 is sufficiently high for the RF signal. Therefore, according to the first embodiment, a signal distortion in the pulse width modulator 13 is suppressed.

In the example described above, although the lookup table is prepared according to the method illustrated in FIG. 10, the invention is not limited to this method. For example, the mapping data for generating the amplitude information $A_{map}$ from the amplitude information $A_{in}$ may be determined by a simulation. In this case, the mapping data is generated based on characteristics of the laser light source 31, characteristics of the photo detector 40, an amplitude of the oscillation signal and so on. In addition, the mapping from the amplitude information $A_{in}$ to the amplitude information $A_{map}$ is not limited to the method using the lookup table. For example, in a case where a mapping function from the amplitude information $A_{in}$ to the amplitude information $A_{map}$ is determined in advance, the amplitude corrector 32 may calculate $A_{map}$ from $A_{in}$ using the mapping function.

In the example illustrated in FIG. 4, the phase information $\varphi_{in}$ is converted into an analog signal by the D/A converter 23 and fed to the oscillator 24. Then the oscillator generates an oscillation signal that has a phase corresponding to the phase information $\varphi_{in}$. Note that the invention is not limited to this configuration. For example, the transmission device 10 may be configured to include a high-speed D/A converter that has a function equivalent to a combination of the D/A converter 23 and the oscillator 24 in place of the D/A converter 23 and the oscillator 24. In this case, the high-speed D/A converter generates an oscillation signal that has a phase corresponding to the phase information $\varphi_{in}$. The high-speed D/A converter may be implemented by, for example, an RF-D/A converter.

Second Embodiment

As a scheme to reduce the cost for configuring a radio communication system, a distributed antenna system (DAS) has been implemented. In the distributed antenna system, a signal processing device that processes a transmission signal and a radio device that outputs a radio signal are separated. The signal processing device may be referred to as a "digital processing unit". The radio device may be referred to as a "remote radio unit (RRU)" or a "remote radio head (RRH)".

FIG. 11 illustrates an example of a distributed antenna system. In this example, the distributed antenna system includes a digital processing unit 50 and a remote radio unit 60, as illustrated in FIG. 11. The digital processing unit 50 and the remote radio unit 60 are connected via an optical fiber link 70. An optical amplifier may be provided on the optical fiber link 70. A plurality of remote radio units 60 may be implemented for one digital processing unit 50.

The digital processing unit 50 transmits a modulated optical signal of a radio frequency (or an intermediate frequency) to the remote radio unit 60. The transmission between the digital processing unit 50 and the remote radio unit 60 is implemented by, for example, radio over fiber (RoF). In the RoF system, a radio frequency signal (RF signal) or an intermediate frequency signal (IF signal) is transmitted via an optical fiber.

The digital processing unit 50 includes the modulation information generator 11 and the optical PWM modulator 30, as illustrated in FIG. 11. The modulation information generator 11 generates the amplitude information $A_{in}$ and the phase information $\varphi_{in}$ of a transmission symbol, as explained with reference to FIG. 2. The optical PWM modulator 30 generates an optical PWM signal based on the amplitude information $A_{in}$ and the phase information $\varphi_{in}$ using the laser light source 31, as explained with reference to FIG. 4. A pulse width of the optical PWM signal depends on the amplitude information $A_{in}$, as illustrated in FIG. 9. A timing of the optical pulse depends on the phase information $\varphi_{1n}$. The optical PWM signal generated by the optical PWM modulator 30 is transmitted to the remote radio unit 60 via the optical fiber link 70.

The remote radio unit 60 includes the photo detector 40, the amplifier 14, the BPF 15, and the antenna 16. The photo detector 40 converts the optical PWM signal output from the laser light source 31 into an electric signal, as explained with reference to FIG. 4. The PWM signal output from the photo detector 40 is amplified by the amplifier 14 and then filtered by the BPF 15. As a result, a modulated RF signal with an amplitude and a phase respectively corresponding to the amplitude information $A_{in}$ and the phase information $\varphi_{in}$ is generated. This modulated RF signal is transmitted to a mobile station via the antenna 16.

As described above, in the transmission system according to the second embodiment, a portion of the function to generate a PWM signal based on the amplitude information and the phase information is implemented in the digital processing unit 50, and the remaining function is implemented in the remote radio unit 60. Specifically, the function to generate an optical PWM signal based on the amplitude information and the phase information is implemented in the digital processing unit 50, and the function to convert the optical PWM signal into an electric signal is implemented in the remote radio unit 60. Here, a quality of the optical PWM signal is less deteriorated even after long-distance propagation. Therefore, according to the second embodiment, a large-scale distributed antenna system in which the remote radio unit 60 is located far away from the digital processing unit 50 can be implemented.

Note that, in the example described above, the transmission system according to the second embodiment is used in the radio over fiber system; however, the invention is not limited to this configuration. That is, the second embodiment can be applied to a configuration in which the optical PWM modulator 30 is implemented in one of a pair of communication devices, and the photo detector 40 is implemented in the other communication device.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A transmission device that outputs a modulated signal based on amplitude information and phase information respectively indicating an amplitude and a phase of a transmission symbol, the transmission device comprising:
   an oscillation signal generation circuit configured to generate an oscillation signal based on the phase information;
   a bias controller configured to generate a bias current based on the amplitude information and a reference current;
   an adder circuit configured to add the bias current to the oscillation signal so as to generate a drive current;
   a laser light source configured to be driven by the drive current;
   a photo detector configured to convert an output light of the laser light source into an electric signal; and
   a bandpass filter configured to filter an output signal of the photo detector so as to output the modulated signal, wherein
   the reference current is determined such that the laser light source generates an optical PWM (pulse width modulation) signal based on the drive current, and such that a width of a pulse of the optical PWM signal corresponds to the amplitude information.

2. The transmission device according to claim 1, further comprising
   an amplifier, implemented between the photo detector and the bandpass filter, configured to amplify the output signal of the photo detector.

3. The transmission device according to claim 1, wherein
   the bias controller includes an amplitude corrector configured to correct the amplitude information such that an amplitude of an output signal of the bandpass filter is linear with respect to an amplitude indicated by the amplitude information, and
   the bias controller generates the bias current based on the amplitude information corrected by the amplitude corrector.

4. A transmission system that includes a first communication device, a second communication device, and an optical fiber link that connects the first communication device and the second communication device, wherein
   the first communication device includes:
      a modulation information generator configured to generate amplitude information and phase information respectively indicating an amplitude and a phase of a transmission symbol from transmission data;
      an oscillation signal generation circuit configured to generate an oscillation signal based on the phase information;
      a bias controller configured to generate a bias current based on the amplitude information and a reference current;
      an adder circuit configured to add the bias current to the oscillation signal so as to generate a drive current;
      a laser light source configured to be driven by the drive current; and the second communication device includes:
- a photo detector configured to convert an output light of the laser light source into an electric signal;
- a bandpass filter configured to filter an output signal of the photo detector so as to generate a modulated signal; and
- an antenna configured to output the modulated signal, wherein the reference current is determined such that the laser light source generates an optical PWM (pulse width modulation) signal based on the drive current, and such that a width of a pulse of the optical PWM signal corresponds to the amplitude information.

5. A transmission method that outputs a modulated signal based on amplitude information and phase information respectively indicating an amplitude and a phase of a transmission symbol, the transmission method comprising:
- generating an oscillation signal based on the phase information;
- generating a bias current based on the amplitude information and a reference current;
- adding the bias current to the oscillation signal so as to generate a drive current;
- driving the laser light source with the drive current;
- converting an output light of the laser light source into an electric signal using a photo detector;
- filtering an output signal of the photo detector using a bandpass filter so as to generate the modulated signal; and
- outputting the modulated signal, wherein
- the reference current is determined such that the laser light source generates an optical PWM (pulse width modulation) signal based on the drive current, and such that a width of a pulse of the optical PWM signal corresponds to the amplitude information.

6. A transmission method that transmits an optical signal from a first communication device to a second communication device via an optical fiber link, the transmission method comprising:
- generating amplitude information and phase information respectively indicating an amplitude and a phase of a transmission symbol from transmission data in the first communication device;
- generating an oscillation signal based on the phase information in the first communication device;
- generating a bias current based on the amplitude information and a reference current in the first communication device;
- adding the bias current to the oscillation signal so as to generate a drive current in the first communication device;
- driving the laser light source with the drive current in the first communication device;
- converting an output light of the laser light source into an electric signal using a photo detector in the second communication device;
- filtering an output signal of the photo detector using a bandpass filter so as to generate a modulated signal in the second communication device; and
- outputting the modulated signal via an antenna in the second communication device, wherein
- the reference current is determined such that the laser light source generates an optical PWM (pulse width modulation) signal based on the drive current, and such that a width of a pulse of the optical PWM signal corresponds to the amplitude information.

7. The transmission device according to claim 1, wherein
- the laser light source has a cut-off region in which an optical power of the laser light source is substantially zero and a linear region in which the optical power of the laser light source linearly changes with respect to the drive current, and
- the reference current is determined such that a peak of the drive current matches a threshold current that is a boundary between the cut-off region and the linear region when an amplitude indicated by the amplitude information is zero.

* * * * *